(12) United States Patent
Vallejo Ureña et al.

(10) Patent No.: US 11,477,208 B1
(45) Date of Patent: Oct. 18, 2022

(54) SYSTEMS AND METHODS FOR PROVIDING COLLABORATION ROOMS WITH DYNAMIC TENANCY AND ROLE-BASED SECURITY

(71) Applicant: Cygnvs Inc., Los Altos, CA (US)

(72) Inventors: Ana Vallejo Ureña, Dublin (IE); Sai Avala, San Francisco, CA (US); Kevin Gaffney, Dublin (IE)

(73) Assignee: Cygnvs Inc., Los Altos, CA (US)

( * ) Notice: Subject to any disclaimer, the term of this patent is extended or adjusted under 35 U.S.C. 154(b) by 0 days.

(21) Appl. No.: 17/476,367

(22) Filed: Sep. 15, 2021

(51) Int. Cl.
*H04L 29/06* (2006.01)
*H04L 9/40* (2022.01)
*G06F 16/22* (2019.01)
*G06Q 10/10* (2012.01)

(52) U.S. Cl.
CPC ........ *H04L 63/105* (2013.01); *G06F 16/2246* (2019.01); *H04L 63/0853* (2013.01); *G06Q 10/101* (2013.01)

(58) Field of Classification Search
CPC ............... H04L 63/105; H04L 63/0853; G06F 16/2246; G06Q 10/101
USPC .......................................................... 726/4
See application file for complete search history.

(56) References Cited

U.S. PATENT DOCUMENTS

| 8,151,323 | B2* | 4/2012 | Harris ................... H04L 67/568 726/13 |
| 8,832,268 | B1 | 9/2014 | Chheda |
| 8,874,741 | B2 | 10/2014 | Hassan et al. |
| 9,240,996 | B1* | 1/2016 | Sinnema ............. H04L 63/1416 |
| 9,858,559 | B2 | 1/2018 | Raleigh et al. |
| 9,953,007 | B2 | 4/2018 | Oyarzabal et al. |
| 9,990,134 | B2* | 6/2018 | Keeler .................. G06F 3/0605 |
| 10,182,045 | B2 | 1/2019 | Banga et al. |
| 10,234,853 | B2 | 3/2019 | Mukkamala et al. |
| 10,467,029 | B1 | 11/2019 | Lin |
| 10,483,003 | B1 | 11/2019 | McNair et al. |
| 10,698,926 | B2 | 6/2020 | Zhou et al. |
| 10,708,135 | B1 | 7/2020 | Elliott |

(Continued)

OTHER PUBLICATIONS

ERMrest: an entity-relationship data storage service for web-based, data-oriented collaboration, Czajkowski etal, Oct. 2016 (Year: 2016).*

(Continued)

*Primary Examiner* — Jahangir Kabir
(74) *Attorney, Agent, or Firm* — Carr & Ferell LLP

(57) ABSTRACT

Systems and methods for providing collaboration rooms with dynamic tenancy and role-based security are disclosed herein. An example method includes establishing a digital collaboration room for an entity, generating a token for a first user, receiving a request to perform an action on a portion of the data, performing a hierarchical permissions analysis to determine if the first user has permission to perform the action and access the portion of the data and determine if the user currently has permission to enter the digital collaboration room. The method includes retrieving the portion of the data from the database for the digital collaboration room and allowing the first user to perform the action when the user currently has permission to enter the digital collaboration room and the user has permission to perform the action and access the portion of the data.

22 Claims, 6 Drawing Sheets

(56) References Cited

U.S. PATENT DOCUMENTS

| | | |
|---|---|---|
| 10,797,964 B2 | 10/2020 | Chheda |
| 10,810,361 B1 | 10/2020 | Venkatraman et al. |
| 10,990,488 B1 | 4/2021 | Brown |
| 11,188,857 B1 | 11/2021 | Hill |
| 2008/0086363 A1 | 4/2008 | Kass |
| 2009/0307166 A1 | 12/2009 | Routray |
| 2010/0088636 A1 | 4/2010 | Yerkes |
| 2010/0169860 A1 | 7/2010 | Biazetti |
| 2011/0010349 A1 | 1/2011 | Ellingson et al. |
| 2011/0173679 A1* | 7/2011 | Perumal ............... G06F 21/30 726/17 |
| 2012/0158821 A1 | 6/2012 | Barros |
| 2013/0191531 A1 | 7/2013 | Kruglick |
| 2014/0089039 A1 | 3/2014 | McClellan |
| 2014/0278755 A1 | 9/2014 | Eberl et al. |
| 2015/0112700 A1 | 4/2015 | Sublett et al. |
| 2015/0120359 A1 | 4/2015 | Dongieux |
| 2015/0134733 A1 | 5/2015 | Maturana et al. |
| 2015/0154643 A1 | 6/2015 | Artman et al. |
| 2015/0163206 A1 | 6/2015 | McCarthy et al. |
| 2015/0172321 A1 | 6/2015 | Kirti et al. |
| 2015/0281453 A1 | 10/2015 | Maturana et al. |
| 2015/0310188 A1 | 10/2015 | Ford et al. |
| 2015/0324400 A1 | 11/2015 | Sheck et al. |
| 2016/0294854 A1 | 10/2016 | Parthasarathi et al. |
| 2016/0335260 A1 | 11/2016 | Convertino et al. |
| 2016/0378450 A1 | 12/2016 | Fu et al. |
| 2016/0378728 A1 | 12/2016 | Pryhuber |
| 2017/0006135 A1 | 1/2017 | Siebel et al. |
| 2017/0041296 A1 | 2/2017 | Ford et al. |
| 2017/0099181 A1 | 4/2017 | Hawking et al. |
| 2017/0124502 A1 | 5/2017 | Brew et al. |
| 2017/0132721 A1 | 5/2017 | Riley |
| 2017/0149630 A1 | 5/2017 | Feller et al. |
| 2017/0169699 A1 | 6/2017 | Will |
| 2017/0195265 A1 | 7/2017 | Billi |
| 2017/0255455 A1 | 9/2017 | Collier |
| 2017/0262142 A1 | 9/2017 | Riley |
| 2017/0282014 A1 | 10/2017 | Quinn |
| 2018/0027006 A1 | 1/2018 | Zimmermann et al. |
| 2018/0144314 A1 | 5/2018 | Miller |
| 2018/0152358 A1 | 5/2018 | Chheda |
| 2018/0165386 A1 | 6/2018 | Soundiramourthy et al. |
| 2018/0181716 A1 | 6/2018 | Mander et al. |
| 2018/0321820 A1 | 11/2018 | Burman |
| 2018/0365278 A1 | 12/2018 | Klöhn |
| 2019/0034047 A1* | 1/2019 | Kwiecien ............ H01J 49/0036 |
| 2019/0065177 A1 | 2/2019 | Khoongumjorn et al. |
| 2019/0095241 A1 | 3/2019 | Ago et al. |
| 2019/0102440 A1 | 4/2019 | Tabak et al. |
| 2019/0163814 A1 | 5/2019 | Coella |
| 2019/0325373 A1 | 10/2019 | Dillon et al. |
| 2019/0339821 A1 | 11/2019 | Vajjala |
| 2020/0034764 A1 | 1/2020 | Panuganty |
| 2020/0067789 A1 | 2/2020 | Khuti et al. |
| 2020/0097920 A1 | 3/2020 | Doctor |
| 2020/0104401 A1 | 4/2020 | Burnett et al. |
| 2020/0104402 A1 | 4/2020 | Burnett et al. |
| 2020/0151836 A1 | 5/2020 | Lingras et al. |
| 2020/0160458 A1 | 5/2020 | Bodin |
| 2020/0162917 A1 | 5/2020 | Anantha et al. |
| 2020/0202271 A1 | 6/2020 | Brannon et al. |
| 2020/0210647 A1 | 7/2020 | Panuganty et al. |
| 2020/0218432 A1 | 7/2020 | Malhotra |
| 2020/0233685 A1 | 7/2020 | Petkov et al. |
| 2020/0234218 A1 | 7/2020 | Salloum et al. |
| 2020/0342520 A1 | 10/2020 | Pandey |
| 2020/0344185 A1 | 10/2020 | Singaraju et al. |
| 2020/0349173 A1 | 11/2020 | Chawla et al. |
| 2021/0120043 A1 | 4/2021 | Karpovsky |
| 2021/0160018 A1 | 5/2021 | Han |
| 2021/0216381 A1 | 7/2021 | Huang |
| 2021/0275899 A1 | 9/2021 | Hyodo |
| 2021/0409218 A1* | 12/2021 | Elmenshawy ............ H04L 9/16 |
| 2022/0027828 A1 | 1/2022 | Avala et al. |

OTHER PUBLICATIONS

Sun et al., ""Designing a Unified Cloud Log Analytics Platform,"" 2016 International Conference on Collaboration Technologies and Systems (CTS), Orlando, FL, 2016, pp. 257-266, doi: 10.11 09/CTS. 2016.0057.

Kilgore et al., "A Precision Information Environment (PIE) for emergency responders: Providing collaborative manipulation, role-tailored visualization, and integrated access to heterogeneous data," 2013 IEEE International Conference on Technologies for Homeland Security, 2013, 6 pages.

Yu et al., "Distributed Big Data Analytics in Service Computing," 2017 IEEE 13th International Symposium on Autonomous Decentralized System (ISADS), Bangkok, 2017, pp. 55-60, doi: 10.1109/ ISADS.2017.17.

* cited by examiner

SYSTEMS AND METHODS FOR PROVIDING COLLABORATION ROOMS WITH DYNAMIC TENANCY AND ROLE-BASED SECURITY

CROSS-REFERENCE TO RELATED APPLICATIONS

This application is related to U.S. application Ser. No. 16/940,272, filed on Jul. 27, 2020, titled "Cloud-Based Multi-Tenancy Computing Systems and Methods for Providing Response Control and Analytics", which is hereby incorporated by reference herein in its entirety, including all references and appendices cited therein, for all purposes, as if fully set forth herein. This application is related to U.S. application Ser. No. 17/477,384, filed on Sep. 16, 2021, titled "SYSTEMS AND METHODS FOR DYNAMICALLY ESTABLISHING AND MANAGING TENANCY USING TEMPLATES", which is hereby incorporated by reference herein in its entirety, including all references and appendices cited therein, for all purposes, as if fully set forth herein.

FIELD OF THE PRESENT TECHNOLOGY

The present disclosure pertains to systems and methods for creating and managing the use of digital or virtual collaboration rooms.

SUMMARY

Some embodiments of the present disclosure are directed to a method comprising establishing a digital collaboration room for an entity, the digital collaboration room is configured to allow users to perform actions on data obtained from a database and placed into the digital collaboration room; generating a token for a first user; receiving a request to perform an action on a portion of the data; performing a hierarchical permissions analysis to: determine if the first user has permission to perform the action and access the portion of the data; and determine if the user currently has permission to enter the digital collaboration room; and retrieving the portion of the data from the database for the digital collaboration room and allowing the first user to perform the action when the user currently has permission to enter the digital collaboration room and the user has permission to perform the action and access the portion of the data.

Some embodiments of the present disclosure are directed to a method comprising receiving a request from a user for data in a digital collaboration room; performing a hierarchical permissions analysis that includes: determining a dependency ordering of one or more actions related to the data; determining if the user has permission to perform each of the one or more actions, in a bottom-to-top manner based on the dependency ordering; and determining if the user currently has permission to enter the digital collaboration room based on an access right; and retrieving the data from a database for the digital collaboration room when the hierarchical permissions analysis is complete.

Some embodiments of the present disclosure are directed to a system comprising a processor and memory for storing executable instructions, the processor executing the instructions to: provide a plurality of digital collaboration rooms for a plurality of entities; allow entities to issue tokens to users to access the plurality of digital collaboration rooms and obtain data from a database; and allow access to the plurality of digital collaboration rooms to the users, where each user is issued one of the tokens, where each of the tokens comprises a tenant identifier, a digital collaboration room identifier, and a role with a set of permissions, the user being allowed to access any of the plurality of digital collaboration rooms for which the user possesses a token of the tokens, the user being allowed to perform one or more actions related to the data based on the set of permissions of the role associated with the token.

Some embodiments of the present disclosure are directed to a method comprising providing a plurality of digital collaboration rooms for a plurality of entities; allowing entities to issue tokens to users to access the plurality of digital collaboration rooms; allowing access to the plurality of digital collaboration rooms to the users, where each user has been issued one of the tokens, where each of the tokens comprises a tenant identifier that identifies one of the plurality of entities, a digital collaboration room identifier, and a role with a set of permissions, the user being allowed to access any of the plurality of digital collaboration rooms for which the user possesses a token of the tokens; allowing the entities to dynamically modify the set of permissions of the role in real-time; receiving a request for data and to perform one or more actions related to the data; performing a hierarchical permissions analysis for the request that includes: determining a dependency ordering of the one or more actions related to the data; determining if the user has permission to perform each of the one or more actions as specified in the token, in a bottom-to-top manner, based on the dependency ordering; and determining if the user currently has permission to enter the digital collaboration room based on an access right in the token; and based on success of the hierarchical permissions analysis: obtaining the data from a database; and allowing the one or more actions to be performed on the data.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Overview

Figure 1:
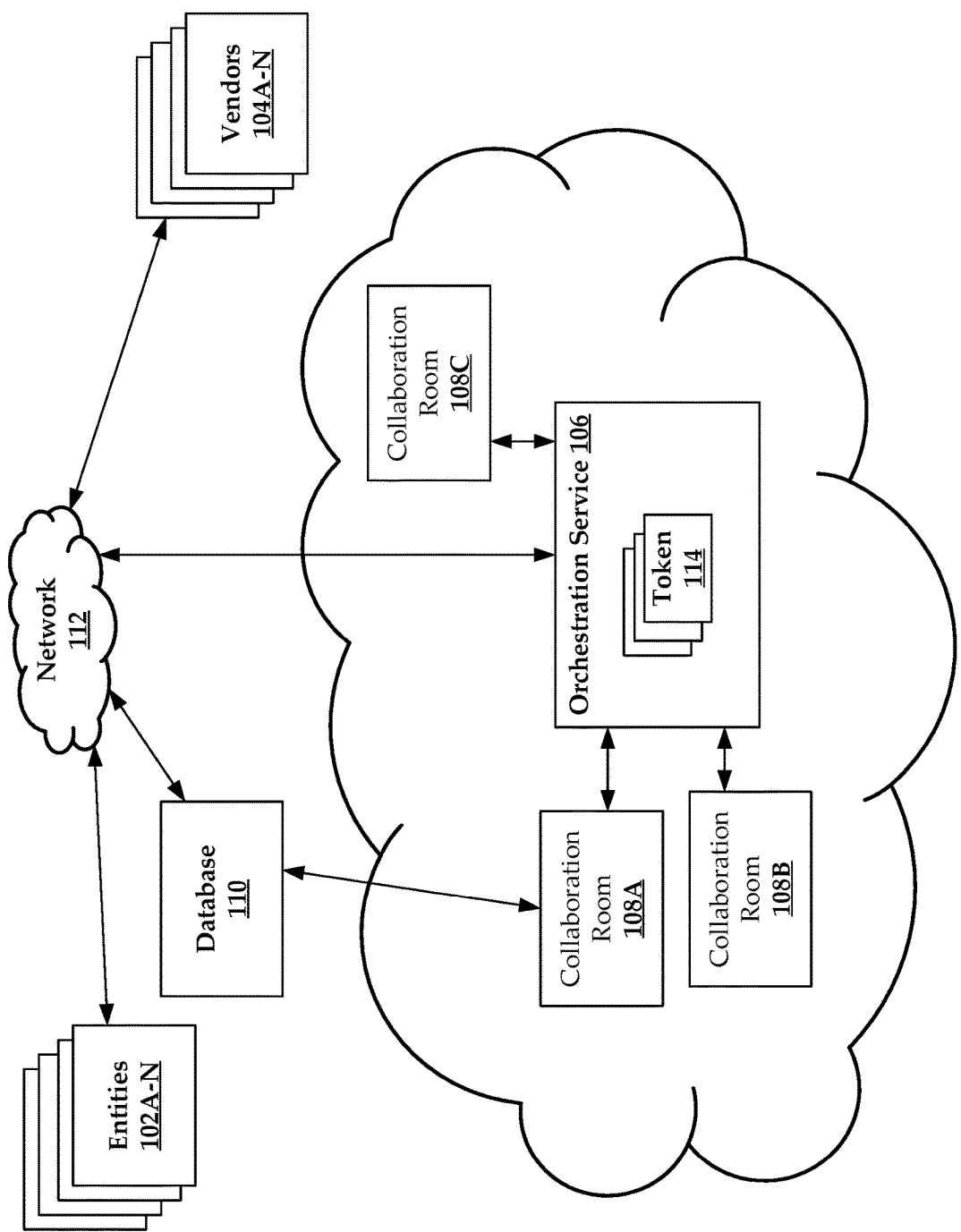
FIG. 1 depicts an example architecture where the systems and methods of the present disclosure can be implemented.

Broadly, the present disclosure is directed to systems and methods for establishing and managing digital collaboration rooms. A plurality of digital collaboration rooms can be established for a plurality of entities, such as companies. A collaboration room can be established to allow users to access data pertaining to an event, such as a lawsuit or a data breach. Users may be associated with the entity or a vendor who may assist the entity with respect to the event. For example, a vendor can include a law firm, a lawyer, privacy counsel, technology consulting, credit monitoring, brokers, public relations, insurance, and notification services—just to name a few. While some embodiments involve creating a collaboration room or other similar virtual collaboration environment based on an event, such spaces can be created for purposes of group collaboration without being connected to or initiated by an event.

The systems and methods provide an orchestration service where entities can maintain collaboration rooms. The orchestration service can also include vendor accounts or profiles. Entities can select vendors to invite to their collaboration room(s). Vendors can access the collaboration room(s) of one or more entities through the orchestration service, and access data depending on their particular permissions or rights granted to them by the entity.

In some instances, many users may need to access data inside the collaboration room and each of these users may have different permissions with respect to the data. The systems and methods can maintain roles that specify the permissions for each user. In one embodiment, the permissions can be modified, resulting in real-time or near-real-time changes to the role of the user. Indeed, the entity is provided with complete control of users that are allowed to enter the collaboration room, as well as what actions the users are allowed to perform on the data inside the collaboration room. In some instances, the permissions for the user, as well as what collaboration rooms they can enter can be encoded into a token.

The systems and methods can perform a hierarchical permissions analysis as users request actions within a collaboration room. In some instances, each time a user performs an action inside the collaboration room, such as refreshing, view, edit, delete, or other similar actions, a hierarchical permissions analysis is executed to determine if the user has permission to perform the requested action, as well as if the user has access rights to be in the collaboration room. This hierarchical permissions analysis can be used to effectuate the dynamic tenancy aspects disclosed herein, as will be discussed in greater detail herein.

Also, in some configurations, the systems and methods may obtain data from a database and allow actions to be performed on the data inside the collaboration room. These data are not maintained in a cache or preserved locally. Thus, access to the data is controlled and actions can only be performed on the data in the collaboration room by an authorized user.

Example Embodiments

FIG. 1 illustrates an example architecture where aspects of the present disclosure can be performed. The architecture may include a plurality of entities, such as entities 102A-N, a plurality of vendors, such as vendors 104A-N, and an orchestration service 106. These components can communicate with one another over a network 112. In general, the architecture creates a global network of users, both entity-related and vendor-related, who can access digital collaboration rooms. Vendors or service providers can publish service-related information. The orchestration service can allow the vendors to be selectable by the plurality of entities.

The entities can also request the creation of collaboration rooms. For example, entity 102A can establish collaboration rooms 108A and 108B, while another entity can establish collaboration room 108C. Entities can control when and how vendors access these collaboration rooms, as well as what kinds of actions the users can perform against data obtained from a database 110. As will be discussed herein, data can be pulled from the database 110 on an as-needed basis. In some embodiments, data does not persist in a collaboration room beyond a session with one or more vendors.

The network 112 can include combinations of networks that enable the components in the architecture to communicate with one another. The network 112 may include any one or a combination of multiple different types of networks, such as cellular, cable, the Internet, wireless networks, and other private and/or public networks. In some instances, the network 112 may include Wi-Fi or Wi-Fi direct. The network 112 can include short-range or radiofrequency links such as BLUETOOTH or ultra-wideband (UWB).

The orchestration service 106 can allow an entity to establish a collaboration room. The digital collaboration room can be configured to allow users to perform actions on data obtained from a database and placed into the digital collaboration room. For example, entity 102A can establish collaboration rooms 108A and 108B, where collaboration room 108A pertains to a first event, such as a cybersecurity breach, and collaboration room 108B, which pertains to a ransomware event. In general, collaboration rooms can be created in response to an incident or event (although in some instances rooms are not created in response to an event, but simply to allow users to collaborate). The orchestration service 106 can assign each entity a tenant identifier. The orchestration service 106 can assign each collaboration room a digital collaboration room identifier.

There are two types of users on the entity side (additional roles can also be specified). For example, entity users can have an administrator role or a participant role. These users are typically employees who help the entity navigate an event. The entity can invite any of the vendors to access a particular collaboration room.

When an entity chooses a vendor from the global network of users, the orchestration service 106 can generate a token 114 for the vendor user. The token 114 can embed a set of long-lived credentials that allow a user to perform an action on data with respect to a tenant (specified by a tenant ID), for a particular collaboration room (specified by a digital collaboration room ID). By long-lived, this means that privileges/permissions can persist until revoked by a user who has the right to revoke permissions. It will be understood that some privileges or credentials can be short-lived as well. For example, some privileges or credentials can be set to expire after a period of time or after a certain number of uses. A user could be allowed to view a document a set number of times, or until the expiration of a date in the future.

Also, when vendor users have been granted access to collaboration rooms of various entities, the orchestration service 106 can allow vendors to enter and exit collaboration rooms as needed. The orchestration service 106 effectively functions as a cloud resource where collaboration rooms, owned by entities, can be hosted and made accessible to vendors.

The token 114 can include any one or more of a tenant identifier, a digital collaboration room identifier, an access right for the user to enter the digital collaboration room, and a role for the user. Generally speaking, the role specifies a set of permissions that indicate actions that can be performed by the user within the collaboration room. For example, a user who is a lawyer may be given a first set of permissions, whereas an insurance broker may be given a second set of permissions. The lawyer may be allowed to access and view any type of document, while the insurance broker may be allowed to access and view only data related to an insurance claim.

While some examples include roles that can be assigned on an individual user level, the orchestration service 106 also allows for the creation of higher-level user roles. For example, a general law firm role can be established which allows any user in the law firm to perform certain actions in the collaboration room.

The orchestration service 106 allows entities to specify what permissions are created for given roles. For example, a lawyer role can include a role with a set of permissions that allows the user to view all data, as well as other actions such as edit, delete, move, and so forth. Again, the orchestration service 106 allows actions to be performed on data placed in a collaboration room. The actions can include, but are not limited to read, view, write, filter, edit, and so forth. For each action, there is a specific and defined permission that can be grated and encoded into a token for the user. In some instances, the permissions are selected by an administrative user of the entity which owns the digital collaboration room.

Additionally, the orchestration service 106 can allow entity administrator users the ability to set visibility of actions within the collaboration room. For example, the administrator may allow all users to see all actions that can be conducted in the collaboration room. In another embodiment, only users internal to an entity can view the actions that are available in the collaboration room. In yet another example, only people listed in a lead of the user section may be allowed to view actions in the collaboration room. For example, a head lawyer or technical specialist may be allowed to view actions, while others on their team may not. In sum, a user may have all or limited view into actions available in the collaboration room.

In some instances, the orchestration service 106 can email a requested vendor a link. The user can click the link to enter the digital collaboration room. For example, the vendor 104A can enter the collaboration room 108A of entity 102A. The orchestration service 106 can evaluate the token of the user to determine if they have permission to enter the collaboration room 108A. In some instances, the token can be linked to a session policy for the user. That is, the actions of the user can be managed on a session-by-session basis.

Once the user enters collaboration room 108A, the user can perform an action on data obtained from the database 110. For example, the vendor may request to view emails regarding a particular topic. In some instances, the orchestration service 106 can provide a query interface where the vendor can query for documents or other data using drop-down boxes, fields, or other input mechanisms.

If there are data responsive to the query, these data can be obtained from the database 110 and made available in the collaboration room 108A. The user can then be allowed to perform one or more actions against the data, assuming the user has permissions for such actions. Thus, the orchestration service 106 can be configured to receive a request to perform an action on a portion of the data. That is, in some instances, the user can perform an action on all or a portion of the data included in the database 110.

The orchestration service 106 can maintain dynamic tenancy within the architecture. Dynamic tenancy allows for the permissions/role of a user to be updated at any time and to have these modifications to the permissions/role become effective in real-time or near-real-time. These changes in permissions/role for a user can occur even in instances where the user is active in the collaboration room. An administrator user for an entity can change the permissions for a vendor user at any time. For example, the permissions/role for a lawyer can be changed. The permissions may initially allow the lawyer to access all data/documents for the entity related to the incident or event associated with the collaboration room. Changes in these permissions may result in the lawyer being allowed to access only a portion of the data due to an identified conflict. In another example, a lawyer can be completely excluded as well, based on an identified conflict. While examples herein contemplate the entity having administrators that can change permissions, some vendor roles may also be allowed to edit permissions for subordinate vendor users. For example, a managing partner of a law firm can manage permissions assigned to individual lawyers in their firm.

As noted above, these permissions can be changed and effectuated in real-time. By way of example, when a user is in the collaboration room viewing documents, the user's permissions to view certain documents may be revoked. When the user attempts to refresh their view or open a document, the user will be blocked when the requested documents are in the portion of the data for which the permissions of the user have been revoked. The user can continue to operate in the collaboration room and perform other actions for which they have permission.

In some instances, the orchestration service 106 enables aspects of dynamic tenancy by performing continual permissions checks or analyses on users in the collaboration room. The orchestration service 106 can perform permissions checks any time a user performs or requests the performance of an action in the collaboration room. This can include actions such as refreshing a view of the collaboration room. In general, any behavior of a user in a collaboration room can be considered an action. Thus, an action is requested each time the user performs a refresh of the data in the digital collaboration room, or other similar actions.

For example, a user currently viewing a document may have their permission to view that document revoked. If the user refreshes their view or requests an action related to the document, access to that document can be revoked such that the user can no longer view or perform actions against that document. Again, as noted above, this can occur on a session-by-session basis, where permissions can be authorized for a session, and the permissions are rechecked in a subsequent session. Changes between sessions to the permissions can result in an alteration of user rights. In sum, an entity user or other authorized user can change the set of permissions which dynamically changes the role of the user, at any time.

To enable this dynamic tenancy and dynamic provision of permissions, the orchestration service 106 can be configured to perform a hierarchical permissions analysis. The hierarchical permissions analysis is a bottom-to-top permissions analysis that determines user who has requested an action has the requisite permission or right to perform the requested action. In some instances, the user can submit a request that requires more than one action. For example, a request to edit a document may include initially a request to obtain the document from the database, along with another request to allow the user to view the document, and finally a request to edit the document. Each of these requests may have a first permission associated therewith. The request to obtain could have a first permission, the request to view have a second permission, and the request to edit may have a third permission. In general, the third permission can depend on the user having the second permission, and the second permission can depend on the user having the first permission. This creates what is referred to as a dependency ordering of one or more actions.

Figure 2:
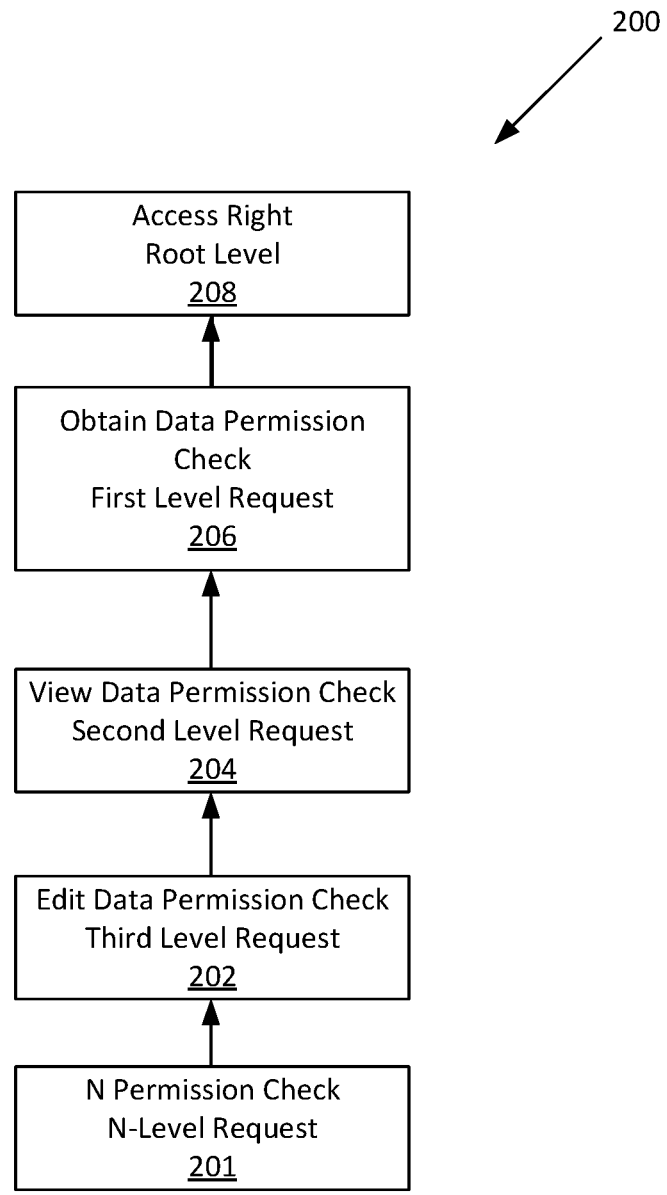
FIG. 2 illustrates an example tree structure for use in a hierarchical permissions analysis.

Referring now to FIGS. 1 and 2 collectively, generally, when more than one action is requested in a session, the actions can be considered as a tree structure 200. In one example, each of the one or more actions can be arranged into branches of a tree structure based on the dependency ordering. A third action would be on bottom level 202 of the tree structure, with the second action on a second level 204 above the third level, and the first action on a first level 206 above the second. A root level 208 of the tree structure can be the access right to the digital collaboration room. In general, each of the one or more actions are arranged into branches of a tree structure based on the dependency ordering, with the access right to the digital collaboration room being a root of the tree structure. While three levels have been shown, any N-number of levels of requests and permissions checks can be present (see 201 of FIG. 2).

In one example, an action or transaction can include either a read or write operation. To write, a user should possess permission to read and/or write from the bottom to the top of a tree structure. To read, a user should possess permission to read from the bottom to the top of a tree structure.

The orchestration service 106 can be configured to determine a dependency ordering of one or more actions related to the data. The hierarchical permissions analysis can include determining if the user has permission to perform each of the one or more actions, in a bottom-to-top manner based on the dependency ordering. Thus, when the user requests the third action of editing the document, the orchestration service 106 can determine if the user has permission to edit the document. Also, the orchestration service 106 also determines if the user has permission to view the document (second action), as well as permission to obtain the document (first permission). Finally, the orchestration service 106 also determines if the user currently has permission to enter the digital collaboration room.

These permissions checks occur in a layered fashion as well. For example, the user may first request only to obtain the document. A permissions check is then performed to ensure the user has the right to obtain the document. When the user then requests to open/view the document, the orchestration service 106 not only determines if they have permission to open/view the document, but the orchestration service 106 can again verify that the user has permission to obtain the document. The orchestration service 106 can also verify that the user currently has rights to be in the collaboration room at each separate permissions check. Thus, the orchestration service 106 can iteratively and/or recursively check for permissions at each level of the dependency ordering.

Again, these permissions checks are performed by the orchestration service 106 to ensure that none of the permissions have changed or been modified. For example, if the right of the user has been revoked to view the document, the user also cannot be allowed to edit the document. If the right of the user has been revoked to obtain the document, the user also cannot be allowed to view or edit the document. It will be understood that the user may still have rights to enter the digital collaboration room and conduct other actions. However, if the access rights of the user to enter the collaboration room have been revoked, the user can perform no actions.

The orchestration service 106 can deny access to all or a portion of the data when the role has been altered and the first user no longer has rights to perform the action. The orchestration service 106 can deny access to perform the action on the data when a permission of a set of permissions has been revoked but the user currently has permission to be in the digital collaboration room. In this example, the user can still be in the collaboration room and potentially be assigned other permissions. As noted above, this hierarchical permissions analysis can be executed each time a user performs any action inside the collaboration room. Also, the hierarchical permissions analysis is performed against the permissions in the token for the user. That is, the orchestration service 106 can convert the permissions into a set of rules that are run over data pulled from the database 110.

Assuming the user request passes the hierarchical permissions analysis, the orchestration service 106 can obtain data from a database and allow the one or more requested actions to be performed on the data.

In some embodiments, a tenant can be associated with one or more vaults (e.g., databases) that store data that can be used in a collaboration. A user can be associated with the tenant. The user can have a specified role, such as a provider/vendor role, a provider/administrator role, and/or a client role. These roles pertain to a collaboration room. A user can have vault roles as well, such as administrator role, a user role, and/or a vendor role. Thus, multiple users can have access to data in the vault. Each user can be allowed to perform one or more actions in a collaboration room related to data obtained from the vault inside the collaboration room.

A task can have n-number of associated tasks, messages, and/or facts. The user and data can have one or more visibility rules applied thereto. Example visibility rules can include, but are not limited to, allowing all users in the collaboration room to view data obtained from the vault, only allowing users internal to the entity to view data, and/or custom confidential users or organizations which can be explicitly added.

Figure 3:
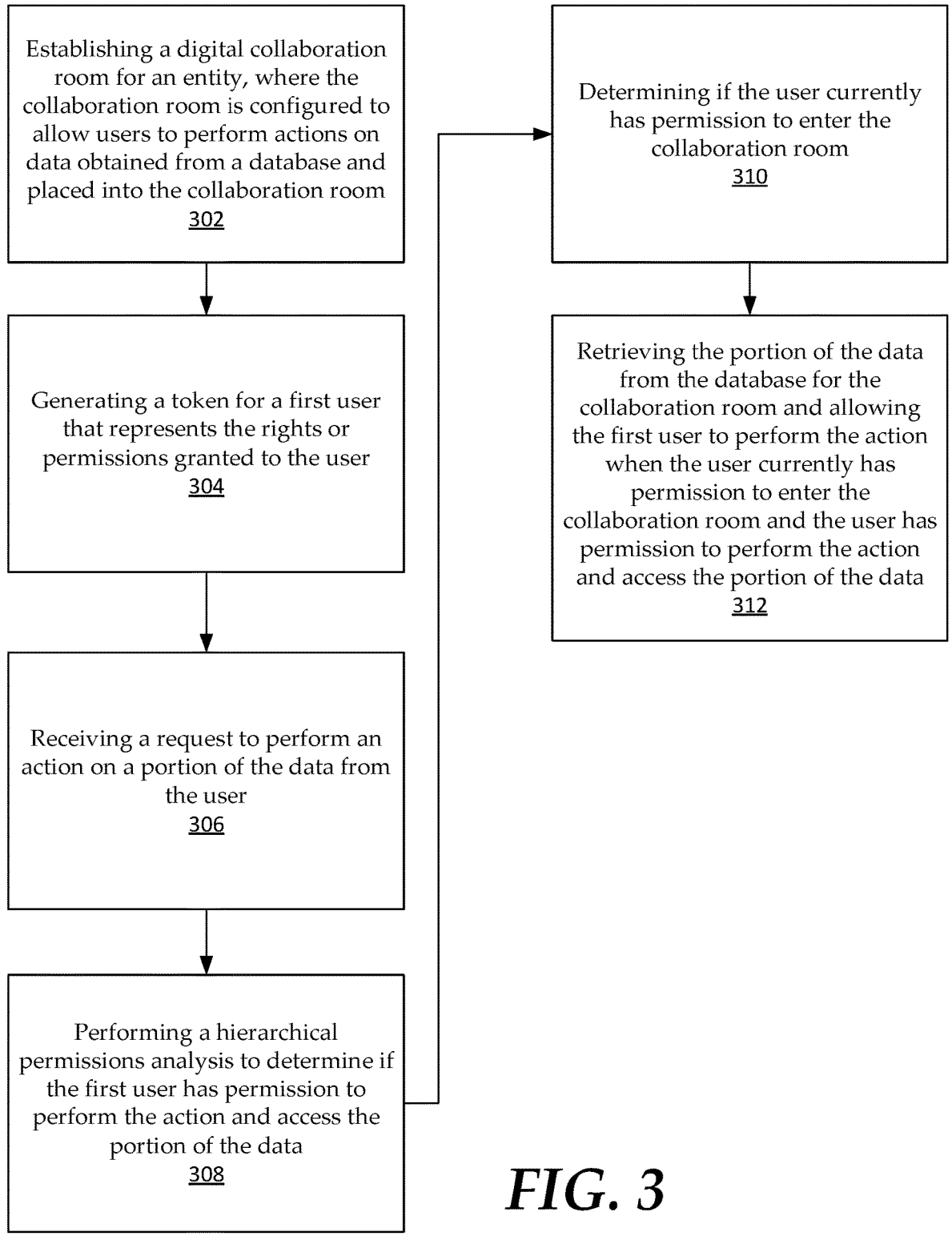
FIG. 3 is a flowchart of an example method of the present disclosure.

FIG. 3 is a flowchart of an example method of the present disclosure. The method can include a step 302 of establishing a digital collaboration room for an entity, where the digital collaboration room being configured to allow users to perform actions on data obtained from a database and placed into the digital collaboration room. In some instances, the entity and collaboration room are each given a unique ID.

Next, the method includes a step 304 of generating a token for a first user that represents the rights or permissions granted to the user. Generating the token may include encoding a tenant identifier, a digital collaboration room identifier, an access right for the first user to enter the digital collaboration room, and a role for the first user. To be sure, the role specifies a first set of permissions that indicate actions that can be performed by the first user.

Steps 302 and 304 can be performed for additional users. That is, a plurality of users can be granted tokens and corresponding permissions related to the collaboration room.

The method can include a step 306 of receiving a request to perform an action on a portion of the data from the user. For example, the user can submit a query to identify documents that are relevant to one or more keywords.

The method also includes a step 308 of performing a hierarchical permissions analysis to determine if the first user has permission to perform the action and access the portion of the data. The hierarchical permissions analysis can also include a step 310 of determining if the user currently has permission to enter the digital collaboration room. As noted above, this can include evaluating an access right included in the token for the user.

Assuming that the permissions analysis is successful, the method can include a step 312 of retrieving the portion of the data from the database for the digital collaboration room and allowing the first user to perform the action when the user currently has permission to enter the digital collaboration room and the user has permission to perform the action and access the portion of the data. If the permissions analysis is unsuccessful, the user can be presented with a message informing them that they lack permission to perform the requested action.

In some instances, the method can include specifying a role for the first user that includes a first set of permissions. The method can also include altering the first set of permissions and denying access to the portion of the data when the role has been altered and the first user no longer has rights to perform the action. Access to perform the action on the portion of the data can also be denied when a permission of the first set of permissions to perform the action has been revoked but the user currently has permission to be in the digital collaboration room. Thus, the access right may be intact and granted while permissions for dependent actions may be active or revoked.

Figure 4:
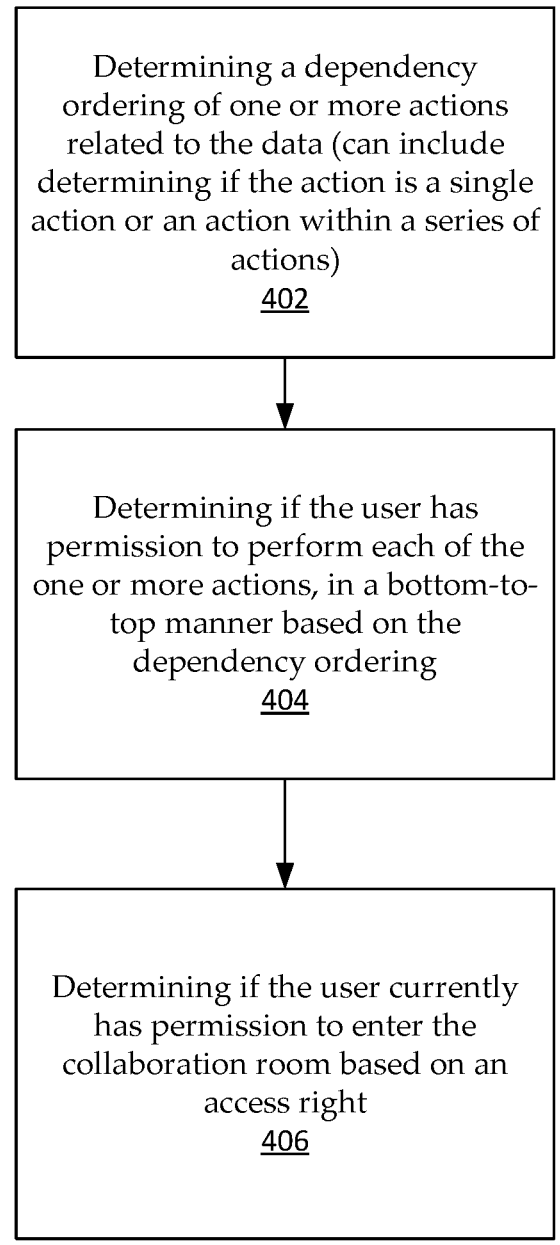
FIG. 4 is a flowchart of an example method of the present disclosure related to an example hierarchical permissions analysis.

FIG. 4 is a flowchart of another example method for performing a hierarchical permissions analysis that includes a step 402 of determining a dependency ordering of one or more actions related to the data. This can include determining if the action is a single action or an action within a series of actions. When more than one action is occurring or has been requested, the method can include a step 404 of determining if the user has permission to perform each of the one or more actions, in a bottom-to-top manner (e.g., iteratively or recursively) based on the dependency ordering. Next, the method includes a step 406 of determining if the user currently has permission to enter the digital collaboration room based on an access right.

Figure 5:
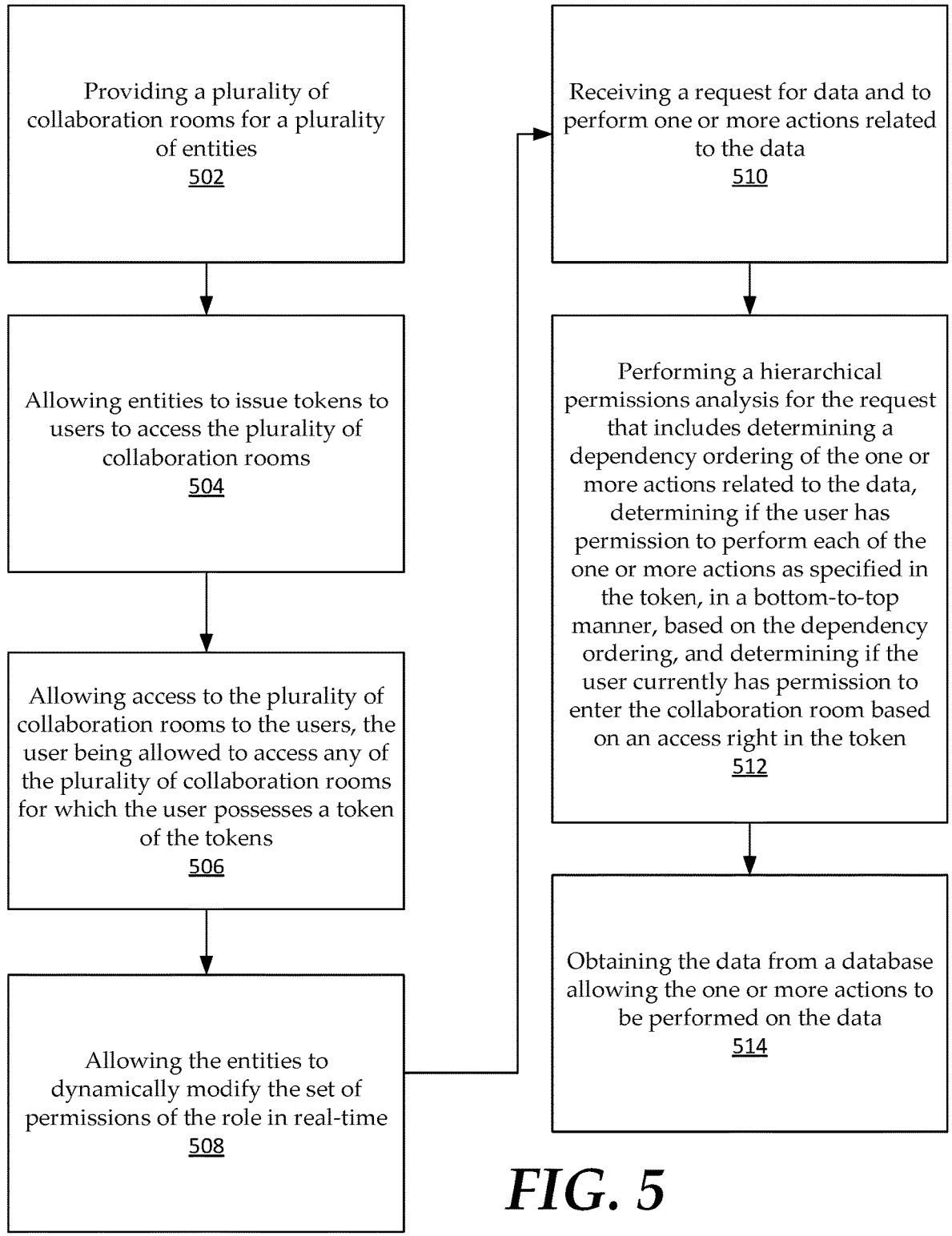
FIG. 5 is a flowchart of an example method of the present disclosure.

FIG. 5 is a flowchart of another example method of the present disclosure. The method can include a step 502 of providing a plurality of digital collaboration rooms for a plurality of entities. The method can also include a step 504 of allowing entities to issue tokens to users to access the plurality of digital collaboration rooms. Each user has been issued one of the tokens and each of the tokens comprises a tenant identifier that identifies one of the plurality of entities, a digital collaboration room identifier, and a role with a set of permissions.

The method includes a step 506 of allowing access to the plurality of digital collaboration rooms to the users, the user being allowed to access any of the plurality of digital collaboration rooms for which the user possesses a token of the tokens. Next, the method includes a step 508 of allowing the entities to dynamically modify the set of permissions of the role in real-time, as well as a step 510 of receiving a request for data and to perform one or more actions related to the data.

In some instances, the method can include a step 512 of performing a hierarchical permissions analysis for the request that includes determining a dependency ordering of the one or more actions related to the data, determining if the user has permission to perform each of the one or more actions as specified in the token, in a bottom-to-top manner, based on the dependency ordering, and determining if the user currently has permission to enter the digital collaboration room based on an access right in the token. Based on success of the hierarchical permissions analysis, the method includes a step 514 of obtaining the data from a database allowing the one or more actions to be performed on the data.

Figure 6:
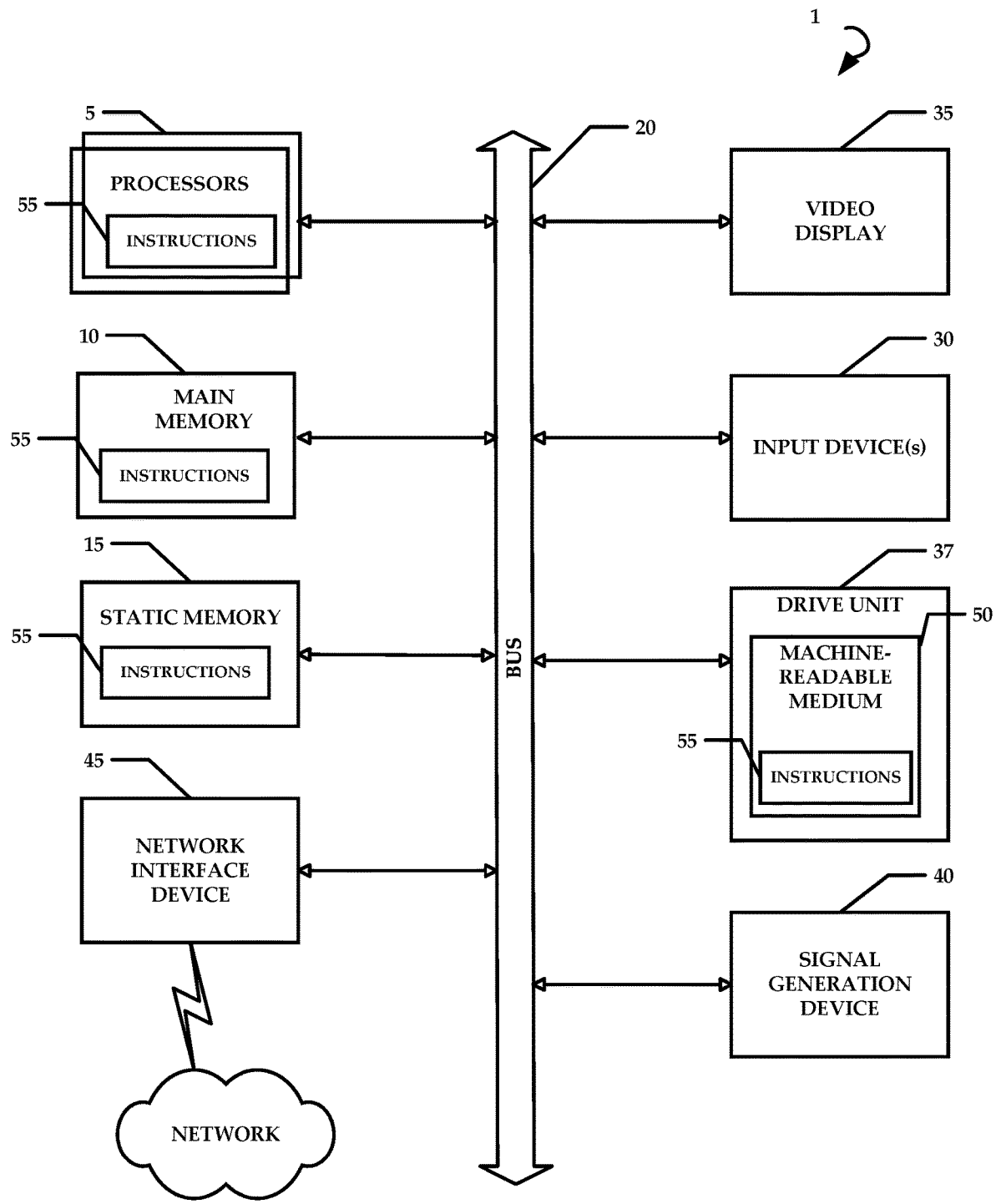
FIG. 6 is a schematic diagram of a computing system that is used to implement embodiments according to the present technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method comprising:
   establishing, via an orchestration service, a digital collaboration room for an entity, the digital collaboration room being configured to allow users to perform actions on data obtained from a database and placed into the digital collaboration room, the entity having control to grant permissions to the users regarding the digital collaboration room and to dynamically modify permissions of the users in real time, the orchestration service being a cloud resource where the digital collaboration room, owned by the entity, is hosted and made accessible to the users;
   generating, by the orchestration service, a token for a user;
   receiving a request to perform an action on a portion of the data;
   in order to enable the entity's dynamic modification of permissions of the user in real time, performing a hierarchical permissions analysis by the orchestration service to:
      determine if the user has permission granted by the entity to perform the action and access the portion of the data; and
      determine if the user currently has permission granted by the entity to enter the digital collaboration room; and
   retrieving the portion of the data from the database for the digital collaboration room and allowing the user to perform the action when the user currently has permission to enter the digital collaboration room and the user has permission to perform the action and access the portion of the data.

2. The method according to claim 1, further comprising specifying a role for the user that includes a first set of permissions.

3. The method according to claim 2, further comprising altering the first set of permissions and denying access to the portion of the data when the role has been altered and the user no longer has rights to perform the action.

4. The method according to claim 2, further comprising denying access to perform the action on the portion of the data when a permission of the first set of permissions to perform the action has been revoked but the user currently has permission to be in the digital collaboration room.

5. The method according to claim 1, wherein generating the token comprises encoding a tenant identifier, a digital collaboration room identifier, an access right for the user to enter the digital collaboration room, and a role for the user, the role specifying a first set of permissions that indicate actions that can be performed by the user.

6. The method according to claim 1, wherein performing a hierarchical permissions analysis further comprises:
   determining a dependency ordering of one or more actions related to the data;
   determining if the user has permission to perform each of the one or more actions, in a bottom-to-top manner based on the dependency ordering; and
   determining if the user currently has permission to enter the digital collaboration room based on an access right.

7. A system comprising:
   a processor and memory for storing executable instructions, the processor executing the instructions to:
   provide a plurality of digital collaboration rooms for a plurality of entities, the entities having control to grant permissions to users regarding a digital collaboration room and to dynamically modify permissions of the users in real time, an orchestration service being a cloud resource where the plurality of digital collaboration rooms, owned by the entities, are hosted and made accessible to the users;
   allow entities to issue tokens to the users to access the plurality of digital collaboration rooms and obtain data from a database;
   perform a hierarchical permissions analysis by the orchestration service that includes:
   determining a dependency ordering of one or more actions related to the data;
   determining if a user has permission to perform each of the one or more actions, in a bottom-to-top manner based on the dependency ordering; and
   determining if the user currently has permission to enter the digital collaboration room based on an access right in a token;
   allow access to the plurality of digital collaboration rooms to the users, where each user is issued one of the tokens, where each of the tokens comprises a tenant identifier, a digital collaboration room identifier, and a role with a set of permissions, the user being allowed to access any of the plurality of digital collaboration rooms for which the user possesses a token of the tokens, the user being allowed to perform the one or more actions related to the data based on the set of permissions of the role associated with the token; and
   allow the entities to dynamically modify the set of permissions of the role in real time.

8. The system according to claim 7, wherein the processor is configured to allow the entities to change the set of permissions which dynamically changes the role of the user, at any time.

9. The system according to claim 7, wherein the each of the one or more actions are arranged into branches of a tree structure based on the dependency ordering, with the access right to the digital collaboration room being a root of the tree structure.

10. The system according to claim 7, wherein the processor is configured to alter the set of permissions and deny access to the data when the role has been altered and the user no longer has permission to perform any of the one or more actions.

11. The system according to claim 7, wherein the processor is configured to deny access to perform an action of the one or more actions when the user lacks permission to perform the action, but the user currently has permission to be in the digital collaboration room.

12. The system according to claim 7, wherein the processor is configured to evaluate the each of the one or more actions at a time when the user performs a refresh or a request for the data in the digital collaboration room.

13. The system according to claim 7, wherein the processor is configured to allow service providers to publish service-related information, the service providers being selectable by the plurality of entities.

14. The system according to claim 7, wherein the processor is configured to allow the user to be blocked from performing at least one of the one or more actions based on a conflict identified for the user, the conflict resulting in revocation of permission for the at least one of the one or more actions.

15. A method comprising:
providing a plurality of digital collaboration rooms for a plurality of entities, the entities having control to grant permissions to users regarding the plurality of digital collaboration rooms;
allowing the entities to issue tokens to the users to access the plurality of digital collaboration rooms;
allowing access to the plurality of digital collaboration rooms to the users, where each user has been issued one of the tokens, where each of the tokens comprises a tenant identifier that identifies one of the plurality of entities, a digital collaboration room identifier, and a role with a set of permissions, the user being allowed to access any of the plurality of digital collaboration rooms for which the user possesses a token of the tokens;
allowing the entities to dynamically modify the set of permissions of the role in real-time;
receiving a request for data and to perform one or more actions related to the data;
in order to enable dynamic modification of the set of permissions of the role, by the entities, in real time, performing a hierarchical permissions analysis for the request that includes:
determining a dependency ordering of the one or more actions related to the data;
determining if the user has permission granted by an entity to perform each of the one or more actions as specified in the token, in a bottom-to-top manner, based on the dependency ordering; and
determining if the user currently has permission granted by the entity to enter a digital collaboration room based on an access right in the token; and
based on success of the hierarchical permissions analysis:
obtaining the data from a database; and
allowing the one or more actions to be performed on the data.

16. The method according to claim 15, wherein the each of the one or more actions are arranged into branches of a tree structure based on the dependency ordering, with the access right to the digital collaboration room being a root of the tree structure.

17. The method according to claim 15, further comprising generating the token by encoding the tenant identifier, the digital collaboration room identifier, the access right for the user to enter the digital collaboration room, and the role for the user, the role specifying permissions that indicate which of the one or more actions that can be performed by the user.

18. The method according to claim 15, further comprising altering the permissions and denying access to the data when the role has been altered and the user no longer has permission to perform any of the one or more actions.

19. The method according to claim 15, further comprising denying access to perform an action of the one or more actions when the user lacks permission to perform the action, but the user currently has permission to be in the digital collaboration room.

20. The method according to claim 15, wherein an action is requested each time the user performs a refresh or request for the data in the digital collaboration room.

21. The method of claim 15, wherein in a first session, the entity grants the set of permissions for the user, and in a second session, the set of permissions for the user are rechecked.

22. The method of claim 21, wherein changes between the first session and the second session to the set of permissions of the user result in an alteration of access rights of the user.

* * * * *